April 9, 1929.                H. E. BRYANT                1,708,049
           MACHINE FOR MAKING CABLE ARMOR AND FLEXIBLE METALLIC CONDUIT
                        Filed Aug. 6, 1923        4 Sheets-Sheet 1
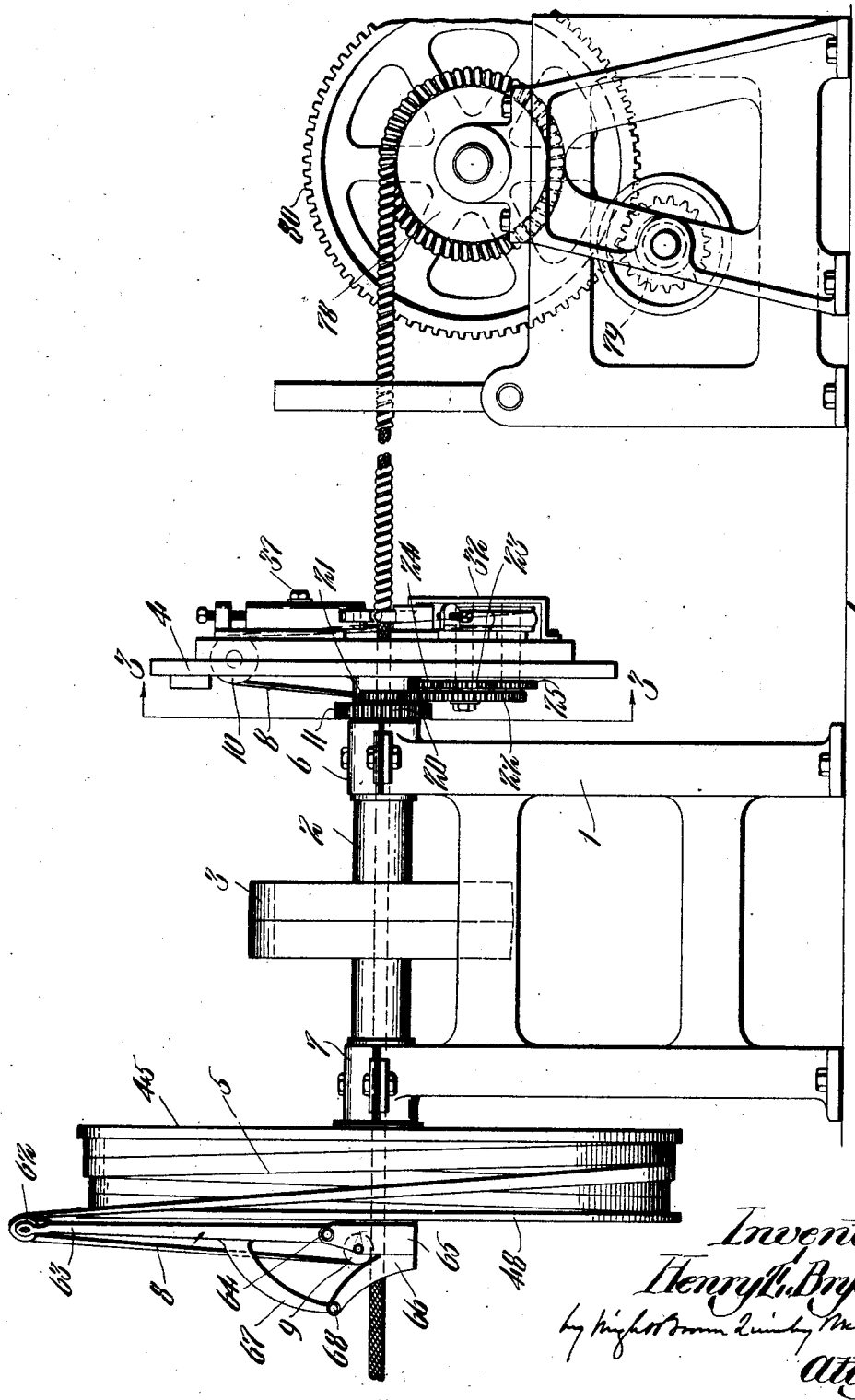

April 9, 1929.  H. E. BRYANT  1,708,049
MACHINE FOR MAKING CABLE ARMOR AND FLEXIBLE METALLIC CONDUIT
Filed Aug. 6, 1923  4 Sheets-Sheet 2
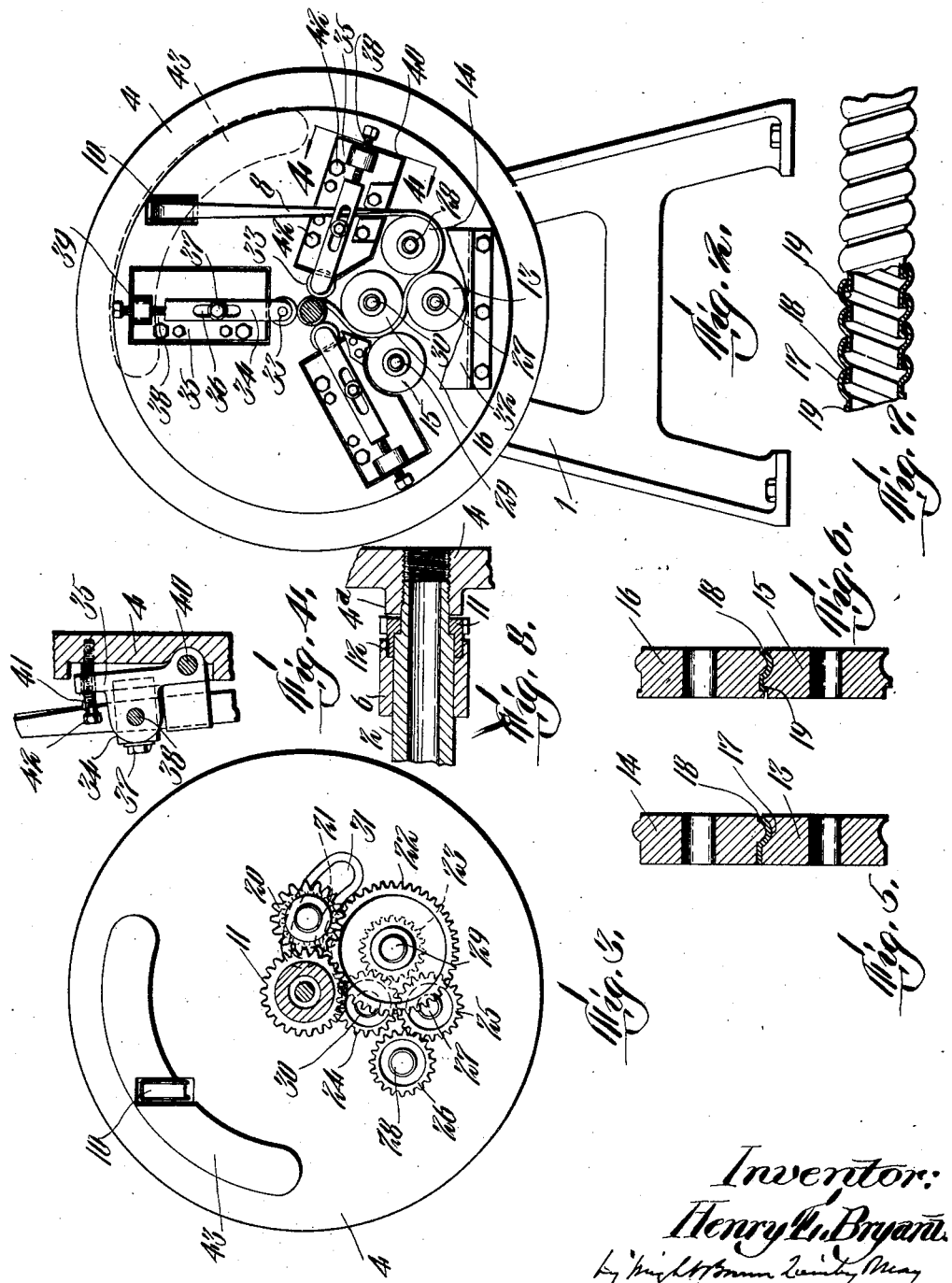

April 9, 1929.   H. E. BRYANT   1,708,049
MACHINE FOR MAKING CABLE ARMOR AND FLEXIBLE METALLIC CONDUIT
Filed Aug. 6, 1923   4 Sheets-Sheet 3
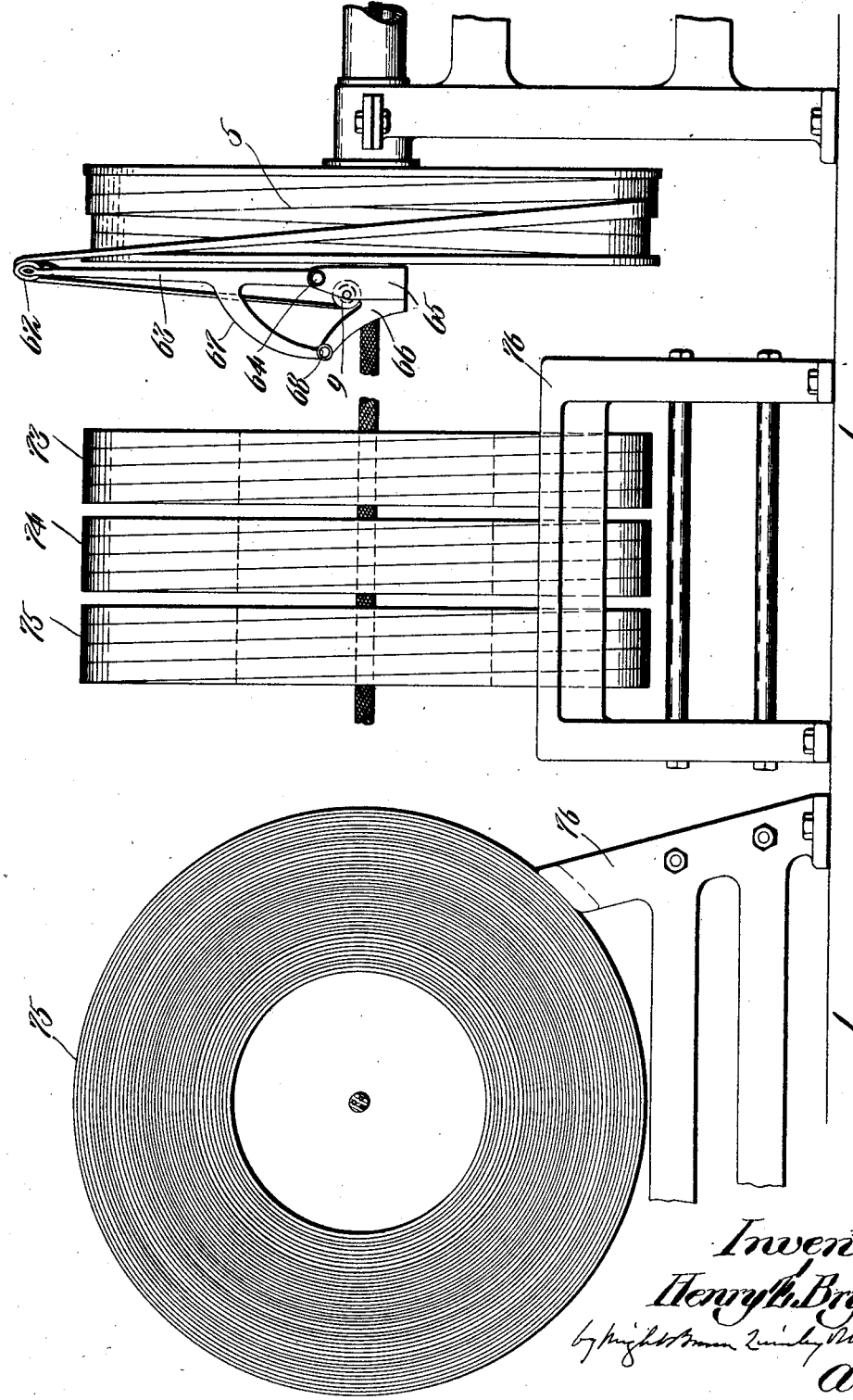

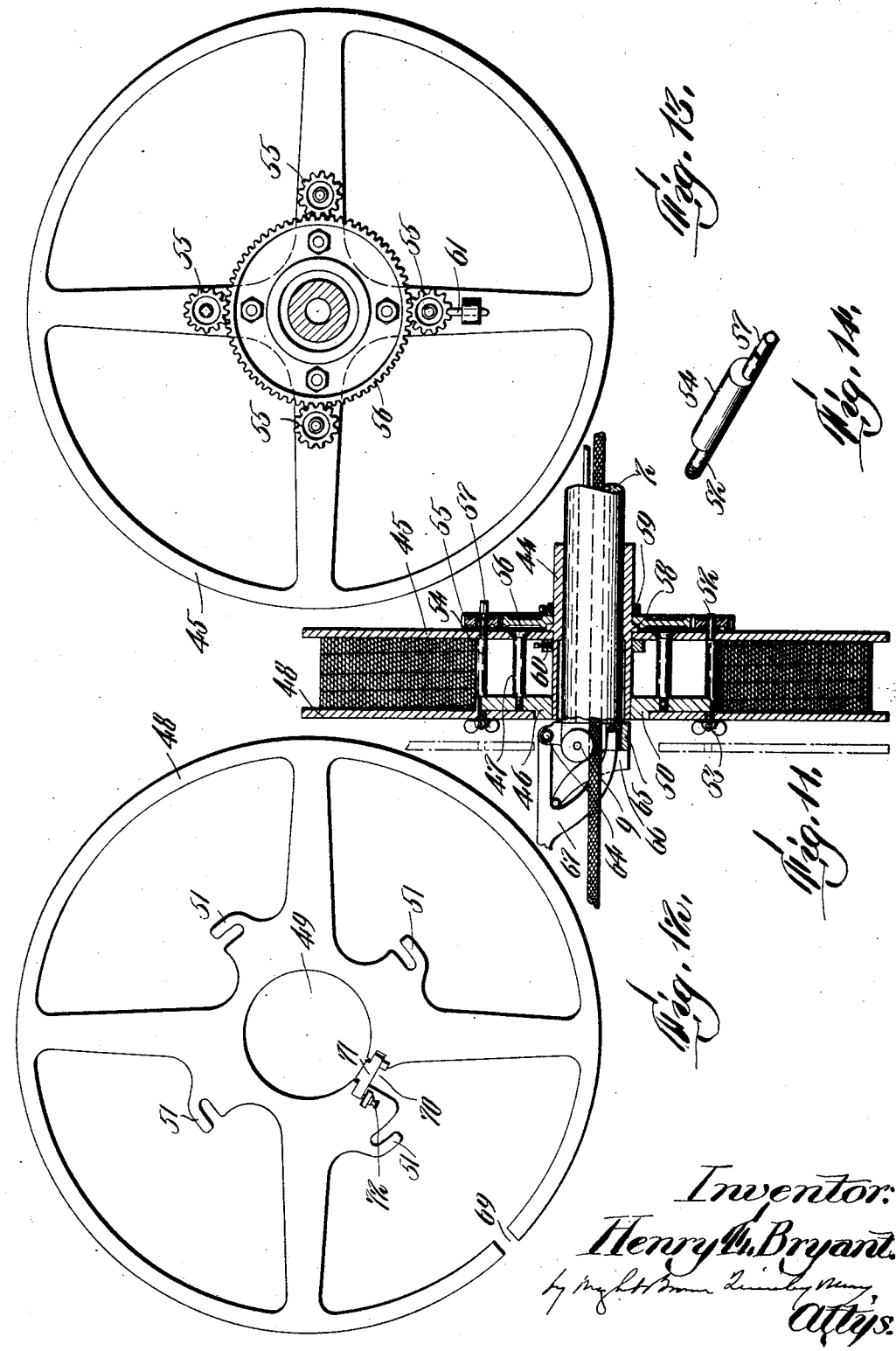

Patented Apr. 9, 1929.

1,708,049

UNITED STATES PATENT OFFICE.

HENRY E. BRYANT, OF PROVIDENCE, RHODE ISLAND, ASSIGNOR TO TUBULAR WOVEN FABRIC COMPANY, OF PAWTUCKET, RHODE ISLAND, A CORPORATION OF RHODE ISLAND.

MACHINE FOR MAKING CABLE ARMOR AND FLEXIBLE METALLIC CONDUIT.

Application filed August 6, 1923. Serial No. 655,945.

The present invention relates to machines for winding strip material helically into tubular form, and in the course of so doing forming interlocking flanges on the edges of the strip adapted to prevent separation of adjacent turns while permitting such movement of the turns upon one another as will afford flexibility to the finished tubing. Such strip material is preferably metal and is customarily of iron or mild steel coated with zinc to protect it from corrosion. It may be wound directly on insulated electrical conductors as an armor for the same, or on other cable like or tubular goods; or it may be wound as an open tube, to serve as a conduit for subsequently receiving electrical conductors or for other purposes.

The machine which I have invented and disclosed herein is adapted to form and wind the strip material in either way, that is, as an armor surrounding an electrical conductor or cable or other core, or as an unoccupied tube. For convenience of description I shall generally refer to the machine, where reference to it by a distinguishing name is required, as a cable armoring machine; but it is to be understood that such descriptive title is not in any sense a limitation of the protection which I claim, but that, on the contrary, I claim and desire to protect all novel features, combinations and characteristics of the machine, to whatever use they are put and upon whatever object they operate, whether the resulting product is a flexible open tube or is a cable, wire or tube surrounded by a flexible helical armor or is another product of similar nature.

Among the objects which I have had in view and have accomplished by this invention are these; to form bend and wind the strip into a tube and interlock its flanges in a continuing operation, by the action of the coiling mechanism; to provide adjustments of the coiling mechanism by which armor or tubing of greater or less diameter may be formed and to accommodate the inclination of the coiling means to different helical pitches of the strip according as the diameter of the armor or tubing is greater or less, or a wider or narrower strip is used; and to provide means for using as the supply of strip material the rolls or bundles of such material as they are delivered from the place of manufacture whereby to avoid the necessity of rewinding such material in shorter lengths on spools or bobbins, which has been necessary with the machines of this class heretofore used, and has limited the output of such machines and been a cause of substantial expense in their operation.

The manner in which these and other objects are accomplished, together with the essential characteristics and principles of the invention, are explained in the following specification in connection with the description in detail of a specific machine embodying one of the possible forms of the invention, with reference to the accompanying drawings,—

In the drawings,—

Figure 1 is a side elevation of the machine above referred to.

Figure 2 is an end elevation of the winding head of the machine as seen from the right of Figure 1.

Figure 3 is a rear elevation of the winding head as viewed from the line 3—3 of Figure 1 in the direction of the arrows applied to such line.

Figure 4 is a detail sectional view on an enlarged scale of the means for adjusting the inclination of the coiling or winding instrumentalities. This view is a section taken on line 4—4 of Figure 2 looking in the direction of the arrows applied to said line.

Figures 5 and 6 are sectional views of the forming and feeding rolls by which the flat strip is formed with interlocking flanges and is fed to the winding means.

Figure 7 is a detail view, partly in elevation and partly in longitudinal section, of a tube formed of coiled strip material by the operation of this machine.

Figure 8 is a detail sectional view of the main shaft and winding head assembly and the means for mounting the primary driving gear for the strip feeding rolls.

Figure 9 is an elevation of that part of the machine which carries the strip material, and shows also means for holding a reserve supply of the strip material.

Figure 10 is a view, as seen from the left of Figure 9, of the reserve strip material and the means for holding it.

Figure 11 is an axial sectional view of the strip holding spool which is shown in elevation in Figures 1 and 9.

Figure 12 is an elevation of the detachable rear head of the strip holding spool.

Figure 13 is an elevation, as seen from the right of Figure 11, of the strip holding spool and the means for centering and locking the strip bundle or roll thereon.

Figure 14 is a detail view showing in perspective one of the eccentric centering and locking elements of the spool.

Like reference characters designate the same parts wherever they occur in all the figures.

The main parts of the machine comprise a frame 1, a shaft 2 on which is mounted a driving belt pulley 3, a winding head 4, and a strip holding spool 5. The shaft 2 is mounted rotatably in bearings 6 and 7 provided on the frame 1. As this machine is adapted to wind armor on insulated electrical conductors or cables, the shaft is tubular having a bore extending from end to end.

A strip 8 passes from the spool 5 on which it is supported around a guide roll 9 on the end of the shaft, extends thence through the bore of the hollow shaft 2, passes out through a slot in the hub of the winding head 4, beside which slot is a guide roll similar to the roll 9 and arranged in any suitable way, thence over a guide roll 10 mounted on the outer part of the winding head, thence to the forming and feeding rolls, and finally to the winding point.

The winding head 4 is made as a base or face plate on which are mounted devices for winding or rolling the strip helically into tube form, the rolls which feed the strip to these winding devices and also impress on the strip the configuration necessary to cause interlocking of the successive turns with one another, and the gearing for driving said rolls. Preferably the base plate is applied to the shaft in the manner shown in Figure 8, being formed with a hub 4ª and a threaded aperture which is screwed on the reduced and threaded end of the shaft 2. Between the hub of this plate and the adjacent end of the bearing 6 is a gear 11, the hub portion of which enters the bearing and is prevented from rotating by a key 12. The shaft rotates within this gear, and the gear is the primary driving element of the train which operates the strip feeding and forming rolls, as will now be described.

There are two pairs of such rolls, namely, the first pair 13, 14, shown in detail in Figure 5, and the second pair 15, 16 shown in detail in Figure 6.

In passing through the nip of the first pair of rolls, the strip is formed with a longitudinal offset 17 which provides a locking flange 18 at one edge and a space adjacent thereto; and in passing through the nip of the second pair of rolls the opposite edge of the strip is formed with a flange or lip 19 projecting oppositely, or approximately so, to the flange 18. For driving these rolls there is provided a gear train on the rear side of the winding head, consisting of a gear 20 in the same plane with the gear 11, and in mesh therewith, a pinion 21 coaxial with and fast to the gear 20 and in a different plane, a gear 22 in mesh with pinion 21, a pinion or gear 23 fast to the gear 22 and coaxial therewith in a different plane, and a series of gears 24, 25 and 26 in the plane of the gear 23, and in which the sequence of driving is from 23 to 24 to 25 and to 26. These gears, 23, 24, 25, and 26 are of such values that they rotate at equal angular speeds. The roll 13 is on the shaft 27 of the gear 25, roll 14 is on the shaft 28 of gear 26, roll 15 is on the shaft 29 of gears 22 and 23, and roll 16 is on the shaft 30 of gear 24. Therefore, and since those rolls are all of the same diameter (except as to the parts which offset the strip in forming it) they are all driven at the same peripheral speed.

In operation the whole train of gears revolves about the primary gear 11, and as the latter gear is stationary, the result is a rotation of the rolls relatively to the head. The gear ratio of the train is made such that the strip is delivered by the feed rolls at the rate necessary to wind it about a core, or on a diameter, of predetermined size. By making the gears 20, 21 and 22 as change gears, and mounting the shaft of gears 20 and 21 adjustably in a slot 31 concentric with the shaft 29, the gear ratio may be altered as required for winding armor on cables, or making tubes, of different diameters. Preferably a cover plate 32 is secured to the outer face of the head 4 to guard the rolls and to provide supporting bearings for the shafts of the rolls.

The winding instrumentalities are rolls 33, grooved to conform more or less closely to the configuration given to the strip. Three of such rolls are here shown, but it is possible to do the work with only one or two, although not so efficiently as with three, and more than three could be used if desired in situations where there is room for them. These rolls and their holding means are substantially like one another, except for one minor detail which will be mentioned presently, wherefore a description of one will suffice for all.

Each roll 33 is rotatably mounted in the end of a bar 34 which is secured to a plate 35, having a slot 36 through which a clamp screw 37 passes into the plate, whereby it may be adjusted to place the roll more or less near to the axis of rotation. Adjacent to the outer end of the bar is a stop-screw 38 passing through a lug 39 on the plate to prevent the roll from being forced away from this axis. Instead of a roll for this purpose the end of the bar may itself be formed and used as the winding tool, or a sliding shoe may be used in place of a roll. The function of these rolls, or equivalent winding tools, is to guide the successive convolutions of the strip into proper interlocked engagement with the preceding convolutions, to determine the diameter of the resulting tubular structure, to confine the diameter within close limits of a given size, to support the part of the turn already wound, while the length of the strip tangent thereto is being curved to the tube diameter, whereby to maintain uniformity of curvature about the winding axis in spite of inequalities of gage and stiffness of the strip, and finally to compress the coiled strip upon the wire or cable within it enough to grip the enclosed cable with the required force.

The pitch of the helix in which the strip is wound is more or less steep according as the diameter of the tube being formed is smaller or larger, and as the strip is wider or narrower for any given diameter. One important feature of the invention consists in means for inclining the planes of the winding rolls more or less to the plane of rotation in conformity with the pitch of the strip necessary to form any particular tube. The several plates 35, on which the forming tools are mounted, are arranged so that they can be tilted.

The arrangement and means for so tilting the plates are shown in Figures 2 and 4. One edge portion of the plate is pivoted to the winding head on an approximately radial axis. This axis may be in the same radius with the center of the winding roll, or at one side of such radius, and when at one side of the radius it is preferably parallel thereto. This is the condition illustrated here, that the axis on which the plate 35 can tilt is parallel to the radius of the head in which the center of the winding roll is located. A rod 40 passing through the plate and held at its ends in the head forms the pivot for this movement in the machine illustrated, and here also the plate is set into a recess in the front face of the head, but other forms and constructions of equivalent means for the same purpose may be made within the scope of my claim to protection. Then for placing the plate and holding it in various adjustments I have provided screws 41 which pass freely through holes in the plate near its opposite edges and are threaded into tapped holes in the head to limit the movement of the plate away from the head, and other screws 42 which are threaded through tapped holes in the plate and bear against the adjacent face of the head to hold the plate away therefrom. By means of these two sets of screws the plate may be adjusted to any helix angle within the limits of adjustment.

It happens that in the form of machine here illustrated the guide roll 10 is so placed that the strip in passing therefrom to the nearest forming roll crosses the holder of one of the winding spools. To provide a passage for the strip, therefore, the bar which holds the tool is cut away on the side next to its supporting plate and the plate also may be cut away on its outer side, if necessary. This course of the strip is made necessary by the limited diameter of head in this design of machine and in order to give room for twisting the strip through a quarter turn from a plane parallel to the head, to a plane perpendicular thereto, as required to pass through the forming rolls and to be wound. Other designs may be made in which such crossing of the strip and winding tool holder is not necessary.

The weight of the forming rolls and of their driving gears, the center of gravity of which is eccentric to the winding axis, is counterbalanced by a weight 43 formed or applied on the rear side of the head.

Another important feature of the invention is embodied in the provision for holding and supplying the strip material. This material is furnished by the makers in large rolls or coils. Machines of this class heretofore made have been unable to take the rolls or coils of strip material as they come from the makers, but instead it has been necessary to re-wind the material in relatively short lengths on bobbins or spools, cutting off from the supply roll the length of material necessary to fill such spool. The supply carried by such spools is soon exhausted. In the case of a representative machine of this class to which I refer as fairly typifying the whole class, it lasts only about fifteen minutes or so. Then the machine has to be stopped while another spool of material is substituted and the end of the stock thereon is welded to the remnant of stock from the exhausted spool. This stoppage, substitution and welding, and starting up the machine again, consume about five minutes. Thus about fifteen minutes time out of every hour that the machine might be run is lost. In other words, twenty-five percent of the working time of the machine is wasted.

I have overcome this serious waste of time by providing the machine with a spool adapted to take the rolls or coils of strip material as they come from the maker. Three of these rolls contain enough stock to feed for an entire day a machine running at the rate of those which require replenishment every fifteen minutes when using a rewound spool. In order to support so great a quantity of stock without applying an eccentric revolving load, I arrange the spool 5 concentric with the shaft. In the machine shown this spool is also at the opposite end of the shaft from the winding head, but this latter feature may be departed from and I have invented another form of winding machine in which the stock holder and winding head are at the same end.

The construction in detail of the spool is shown in Figures 11 to 14. It is mounted to turn freely on a sleeve or bushing 44 which is secured in the bearing 7 and in which the main shaft turns. The principal parts of the spool are a head 45, a disk 46 secured to the head 45 and spaced therefrom by bolts 47, and a retainer 48. The retainer is detachably mounted on the disk 46, having a central hole 49 which fits over a boss 50 on the disk and having hooks 51 adapted to slip over the projecting ends of shaft rods 52 back of nuts 53 which are screwed on such projecting ends.

The shaft rods 52 have eccentric portions 54, as shown in detail in Figure 14, and are positioned close to the inner circumference of the roll of stock. Their opposite ends pass through the head 45 and carry pinions 55, all meshing with a large idle gear 56. One of these shaft rods has a square end 57 to receive a wrench. The large gear 56 turns freely on sleeve 44, being confined between a flange 58 on such sleeve and a collar 59 which is secured to the sleeve by a set-screw. The head 45 is similarly confined between the same flange 58 and another collar 60 mounted on the sleeve and secured by a set-screw. When the retainer 48 is removed a roll of strip material can be slipped over the disk 46 and the shaft rods 52, the latter being then turned so that their eccentric parts project inward. Then, after the retainer has been applied, rotation of one of the shaft rods by a wrench applied to its square end, in a manner to revolve its eccentric part outwardly, causes an equal and like rotation of all the eccentric shaft rods, whereby the roll of strip material is both centered on the spool and locked so that it cannot slip. A locking pin 61 is mounted on the head to engage one of the pinions 55 so as to lock the eccentric shafts.

To guide the strip from the spool and around the retainer 48 to the guide roll 9 at the entrance to the bore of the shaft, I have provided a guide roll 62 on the outer end of a radial bar or rod 63 which is pivoted at 64 to a collar 65 fixed to the shaft. This guide device, of course, rotates with the shaft and the spool rotates in the same direction freely on the sleeve 44 under the pull of the stock being drawn off to form the armor. The guide bar 63 may be swung about the pivot 65 which connects it to the collar 64, in order to permit removal of the retainer 48. It is held in its normal upright position by a bracket 66 on the collar and a branch 67 on the arm, which are locked together by a removable pin 68 when the arm is upright.

When the guide bar is placed parallel to the shaft, as shown in Figure 11, its greatest dimension transversely to the shaft is less than the diameter of the opening 49 and the latter can then be removed from the spool. In order then to withdraw the retainer from the cable, the retainer is formed with lateral passages 69 and 70 opening through the rim and entering the opening 49, respectively; between which passages there is an open space wide enough to receive the cable. A gate 71 is pivoted so as to cross the passage 70 adjacent to the rim of opening 49 in order either to open or close such passage. It may be secured in a closing position by lock 72. When the retainer is separated from the spool and removed from the cable, a fresh coil of strip stock may be placed on the spool, after which the retainer may be replaced.

A reserve supply of material is provided in the form of rolls or coils 73, 74, 75, etc. on a rack 76 adjacent to the spool 5. Enough rolls may be thus provided to supply the machine for an entire day, or for such other working period as may be desired. In making the machine ready to start, the cable is led from its holder through the reserve rolls and the latter, therefore, are in position to be readily placed on the spool when the guide arm is placed parallel to the shaft, and the retainer 48 is removed. As is clearly shown in Figures 9 and 10, the rack 76 is so formed that it supports the strip rolls stably in upright position by engagement of their outer surfaces, holding them in axial alinement with their inner openings unobstructed and permitting free passage of the cable or other article which is being armored.

While the mode of operation of the machine will be readily understood from the foregoing description, it may be briefly described as follows. A coil of strip material having been placed on the spool 5 and the strip led over the various guide rolls and through the tubular shaft to the forming rolls, rotation of the winding head causes the forming rolls to draw the strip from the spool, form it into the desired configuration, and feed it positively to the winding point. The spool meanwhile is free to turn and deliver the strip to the forming rolls. The latter in turn are driven at such speed that the strip is fed to the winding point at the rate necessary to wind a helix of a predetermined diameter and helix angle. Then the winding rolls apply positive pressure to the coils of the strip, bending them to the required diameter of the armor or tube, and pressing them against the wire or cable, in case any such is present. No mandrel is used because the stiffness of the strip itself is enough to prevent the pull of the forming rolls from winding it on too small a diameter. The winding rolls 33 are practically necessary to bring the helix down to as small a diameter as is required, and to give a uniform curvature to the strip.

As fast as the armored tube is completed, it is taken away from the machine by a takeup drum 78 driven by gearing 79 and 80 at a rate sufficient to maintain tension in the finished product.

What I claim and desire to secure by Letters Patent is:

1. A winding machine comprising a rotatable winding head, complemental rolls rotatably mounted on said head arranged and coacting with one another to grip and feed strip material toward the axis of the head, positive driving means for impelling said rolls simultaneously with the rotation of the head, and means mounted on the head for forming the strip material into a helix of given diameter, said last named means being adjustable about an axis transverse to the rotational axis of the head into conformity with the helix angle of the product.

2. A machine according to claim 1 in which the helix forming means is a roll adapted to bear on the outer surface of the strip being formed, and the machine also comprising means for adjusting said roll to bring its rotating periphery into conformity with the helix angle of the structure being produced.

3. A machine for winding strip material into helical form with overlapping and interlocked edges, comprising a rotatable winding head, a spool or stock holder mounted to rotate coaxially with said head at one end of the machine and constructed to receive a ready wound coil of such strip material and mounted for rotation with and independently of said head about the same axis as the head, means on the head for coiling the strip material into the prescribed helical formation, and guide means for leading the strip material from said spool to said coiling means.

4. A winding machine of the character set forth comprising a rotatable winding head, a single holder for a coil of the material to be wound mounted rotatably coaxially with said head, two pairs of complemental rolls carried by said head and arranged in series to grip, form and feed strip material, means for driving said rolls positively in the course of rotation of the head, and guiding means for conducting the material from the holder to the first pair of said rolls.

5. A winding machine of the character set forth comprising a hollow shaft, a winding head secured to said shaft and rotatable therewith, a spool mounted coaxially with said shaft and rotatable independently thereof, holding a supply of strip material, means mounted on the head for winding strip material into a helix, and means for conducting the strip material from the spool into the interior of the shaft and thence to said winding means.

6. The combination with a cable armoring machine having means for winding strip material helically about a cable, of a spool rotatable about said cable and adapted to hold a commercial coil of strip material, and means for holding such a coil in a stationary position surrounding the cable and ready for application to the spool.

7. The combination with a winding machine having a rotatable winding head and a strip-holding spool coaxial with said head and mounted at one end of the machine, of a rack adjacent to said spool and having provisions for holding a roll of such material by engagement with the outer periphery thereof and in a position such that a cable passing through said spool may also pass through said roll.

8. A winding machine of the character set forth comprising a supporting structure, a hollow shaft rotatably mounted on said structure, a winding head secured to said shaft adjacent to one end thereof, a spool mounted on the supporting structure adjacent to the opposite end of the shaft and arranged to surround the axis of the shaft, said spool being constructed and arranged to leave an open passageway through which stock may pass from the periphery of the spool into the shaft, and a stock guide rotatable about the shaft and arranged to conduct the stock from the spool into the shaft.

9. A winding machine of the character described comprising a rotatable hollow shaft, a winding head secured to the shaft, a coil-holding spool rotatably mounted upon the shaft adjacent to one end thereof, a guiding arm mounted on such end of the shaft beside said spool, which arm is mounted with provision for displacement out of the way of the spool, and a removable head at that end of the spool next to said arm, such removable head having a central opening of less diameter than the inner periphery of the coil of strip material and of greater diameter than that end of the shaft on which said arm is mounted.

10. A winding machine as set forth in claim 9 in which the strip guiding arm is pivoted to the shaft so as to be placeable in a position parallel thereto or a position transverse thereto beside the spool.

11. A machine for producing a flexible tubular structure out of strip material wound into a helix, comprising a rotatable winding head, guiding means for conducting strip material to said head, positive feeding means carried by the head for drawing the stock to the winding point and coiling rolls surrounding the axis of the head, said coiling rolls being mounted to turn upon axes inclined to the axis of the head at an angle substantially equal to the helix angle of the stock being wound, and adjusting means for inclining said rolls more or less in conformity with the helix angle of goods manufactured with a steeper or less steep pitch.

12. In a machine for winding strip material into a helical structure, including a winding head and coiling rolls mounted on said head, means for mounting said rolls with provision for adjustment conformable to the pitch of the helix being produced, comprising a holder for said roll pivoted to the head on an axis substantially radial to the axis of the head, and means for setting said holder in various positions of angular adjustments about its axis.

13. A winding machine of the character set forth comprising a driving shaft, a stationary bearing in which said shaft rotates, a winding head secured in a detachable manner to the end portion of said shaft outside of said bearing, a gear loosely surrounding said shaft at the same side of the bearing as said head and detachably engaged with the bearing, feed rolls mounted rotatably on the head, and gearing for rotating said rolls including a gear in mesh with the first named gear.

14. A winding machine of the character described comprising a frame having a bearing, a shaft rotatably supported in said bearing and protruding at one end therefrom, a gear loosely surrounding the said protruding shaft and formed with a hub portion extending into the bearing, means for locking said hub to the bearing to prevent rotation of the gear, a winding head detachably mounted on the protruding shaft, and feeding rolls mounted rotatably on the head and geared to the before mentioned gear to be driven thereby in the course of rotation of the head.

15. In a machine of the character described, a rotatable winding head, winding instrumentalities carried by said head, a spool or holder for the material to be operated upon mounted and freely rotatable coaxially with said head at one end of the machine, adapted to receive a coil of the material, and a displaceable retainer for the material on said spool or holder.

16. In a machine of the character described, a rotatable winding head, winding instrumentalities carried by said head, a spool or holder for the material to be operated upon mounted and freely rotatable coaxially with said head at one end of the machine, adapted to receive a coil of the material, and a detachable outer head for said spool or holder to retain the coiled material thereon.

17. In a machine of the character described, a rotatable winding head, winding instrumentalities carried by said head, a spool or holder for the material to be operated upon mounted and freely rotatable coaxially with said head at one end of the machine, adapted to receive a coil of the material, and a displaceable retainer for the material on said spool or holder, and said displaceable retainer being at the outer end of the spool and arranged, when displaced, to leave the spool open for placement thereon of such coil.

18. In a machine of the character described, a winding head, means carried by the winding head for positioning strip material to form a helix with the edges of the adjacent turns thereof overlapping, and adjusting devices for shifting said positioning means conformably to the pitch of the helix being formed.

19. In a machine of the character described, a winding head, means carried by the winding head for positioning strip material to form a helix with the edges of adjacent turns thereof overlapping, and adjusting devices for shifting said positioning means conformably to the pitch of the helix being formed, said adjusting devices comprising an angularly tiltable holder for said positioning means, and adjusting screws engaged with said holder and reacting on the head for tilting the holder at various angles.

In testimony whereof I have affixed my signature.

HENRY E. BRYANT.